United States Patent [19]

Bagard

[11] Patent Number: 6,042,662
[45] Date of Patent: Mar. 28, 2000

[54] PROCESS FOR MANUFACTURING AN ARTICLE MADE OF AN OXIDE-DISPERSION-STRENGTHENED ALLOY

[75] Inventor: Jean-Paul Bagard, Chatenoy-le-Royal, France

[73] Assignee: SEVA, Chalon-Sur-Saone, France

[21] Appl. No.: 09/099,206

[22] Filed: Jun. 18, 1998

[30] Foreign Application Priority Data

Jun. 18, 1997 [FR] France .................................. 97 07562

[51] Int. Cl.$^7$ ................................ C21D 8/00; C22F 1/10
[52] U.S. Cl. ....................... 148/676; 148/677; 148/621; 148/648; 148/653
[58] Field of Search .................................. 148/677, 676, 148/621, 648, 649, 653

Primary Examiner—Deborah Yee
Attorney, Agent, or Firm—Oblon, Spivak, McClelland, Maier & Neustadt, P.C.

[57] ABSTRACT

This process makes it possible to manufacture articles of any shape by stamping, in which articles the matrix of the alloy has to have a coarse-grained structure. According to the invention, a partial hot-forming operation is carried out by stamping a blank made of an oxide-dispersion-strengthened alloy, especially a nickel-based alloy, having an initial ultrafine-grained structure, in order to form a shaped component, this shaped component is subjected to a secondary recrystallization heat treatment so as to develop an abnormal grain growth, and then a new hot-forming operation is carried out by stamping in order to give the recrystallized shaped component the final shape of the article.

9 Claims, 3 Drawing Sheets

PROCESS FOR MANUFACTURING AN ARTICLE MADE OF AN OXIDE-DISPERSION-STRENGTHENED ALLOY

BACKGROUND OF THE INVENTION

1. Field of the Invention

The present invention relates to the manufacture of shaped articles made of an oxide-dispersion-strengthened alloy, preferably by hot forming plates or sheets made of such alloys.

2. Discussion of the Background

Oxide-dispersion-strengthened alloys are superalloys, especially nickel- and/or iron-based superalloys, containing as a dispersion within their matrix fine oxide particles which, by preventing dislocations from migrating, make the material very strong, this being up to very high temperatures.

Their very good tensile strength, thermal fatigue strength and corrosion resistance make these materials very advantageous for industrial applications in which components are highly stressed at high temperature, such as compressors, turbocompressors, aeronautical or aerospace turbines, and tools which can be used in the production and/or conversion of glass. These materials are obtained by powder metallurgy, by making a mechanical alloy of various metals with atomization of metal powders in a suitable mixer, which alloy is then forged, extruded and hot rolled At this stage, the material has undergone so-called "primary" recrystallization and the matrix of the alloy has a microstructure consisting of submicron ultrafine grains (the size is about 50 nm to 1 $\mu$m) in which the small oxide particles are dispersed.

Improved strength properties may be obtained by a so-called "secondary recrystallization" heat treatment. This treatment, which consists of annealing at a defined temperature which depends solely on the composition of the alloy, is intended to increase the size of the grains. The treatment is considered to have succeeded when a so-called "abnormal" grain growth is observed which gives a final structure consisting of very coarse anisotropic grains of elongate shape, having a length of a few centimeters, slip at grain boundaries being very difficult in such a structure.

Unfortunately, it has been found that the success of such a treatment for one alloy specimen is not guaranteed for another one of identical composition and it has been shown that the technical history of a specimen has an influence on its ability to produce the desired abnormal growth; that is to say that the treatments, especially the heat and mechanical treatments, received by the alloy in order to form the specimen which it is intended to undergo to the secondary recrystallization annealing determine the behavior of the specimen during this treatment.

These differences in behavior have been demonstrated, for example, in EP-A-0,447,858 which proposes, as a consequence, a method for adapting the rate of temperature rise of the recrystallization treatment to a given substrate, such as a plate or a bar.

Among the important steps in the technical history of such an alloy may first of all be included the production of the alloy by mechanical means which involves extremely complex mechanisms and whose control is very difficult, and then the steps of consolidating and of forming the alloy to its final shape before recrystallization. Each of these steps contributes significantly to varying the ease with which the alloy can recrystallize, and a very slight fluctuation of one single treatment parameter is liable to affect the abnormal growth capability of the alloy very greatly.

In fact, the manufacturers of oxide-dispersion-strengthened alloys are able for the moment to control this capability roughly, but only for relatively simple shapes, and the only articles having a coarse-grained matrix which are available on the market are in the form of plates or of bars of round or rectangular cross-section.

On the other hand, the production of components with a more complex shape having a coarse-grained strengthened matrix poses a problem for which a fully satisfactory solution has not yet been found.

Attempts have already been made to manufacture shaped components from non-recrystallized materials, initially in the form of plates, or bars which are not cold-bendable, using hot-forming techniques (at around 1000° C.), these components being subjected, once the forming has been completed, to recrystallization annealing intended to cause grain growth. However, although the alloy in its initial form does have, a priori, the capability of abnormal growth on recrystallization under conditions specified by the manufacturer, the shaped component can be recrystallized with greater or lesser ease and it frequently happens that, at the end of the process, the alloy does not develop a coarse-grained structure or develops it only over part of the cross-section of the component. These manufacturing runs generally include a proportion of defective articles which is much too high to be acceptable.

For the manufacture of objects having a symmetry of revolution, techniques have been proposed for manufacturing from bars of alloy, in which techniques the bars are converted into profiled elements, especially by circular hot rolling or by hot spin forming, and then subjected to recrystallization annealing. The main drawback of these techniques is the lack of precise control of the temperature of the component during its shaping, and consequently of the general conditions of the thermomechanical treatment. In fact, components manufactured in this way quite rarely have the desired microstructure at the point where it is necessary.

Another, simpler method has been proposed, in document EP-A-0,668,122, for manufacturing concave components forming container elements for a fluid, this time by stamping, starting with blank made of refractory alloy such as an oxide-dispersion-strengthened alloy. The process consists in coating the blank with a ceramic-based coating, then in carrying out hot-stamping forming operations during which the coating acts both as a lubricant and as a thermal insulant, and finally in subjecting the cooled component to a secondary recrystallization heat treatment. Although this technique allows the forming temperature to be well controlled, by virtue of the ceramic coating, it still happens that certain components do not develop the desired coarse-grained structure, or only do so over certain parts of their cross-section, even if one tries to modify the stamping temperature or the recrystallization temperature.

This is because, unlike the bars, the plates and sheets from which the blanks are cut out have a technical history involving many thermomechanical treatment operations, in particular hot rolling, which means that, although the capability of abnormal growth during secondary recrystallization is quite homogeneous within the same batch of plates, this capability sometimes radically changes from one batch to another.

Thus, although certain plates, after having been formed by stamping according to EPA-0,668,122, are capable of developing a coarse-grained microstructure typical of abnormal growth, it has been found that in other plates, of identical composition, the recrystallizability is inhibited during the process and the resulting components are defective. Of course, it would be desirable, in order to avoid too high a scrap rate, to find a way of converting these same plates to the desired shape without losing the capability of abnormal growth.

OBJECTS OF THE INVENTION

The problem that the present invention solves is to provide, in a component formed by stamping an alloy blank, a coarse-grained structure at any point in the component, or at the very least at any point where this structure is desirable in order to improve the strength, and this structure being obtained so whatever the technical history of the material of which the blank is composed and whatever the final shape of the component, i.e. even if the creation of this shape requires high stamping stresses and a high stress state of the material during the stamping operation.

SUMMARY OF THE INVENTION

The present inventors have discovered, surprisingly, that once a coarse-grained structure has been obtained by secondary recrystallization treatment with abnormal grain growth, the recrystallized-alloy component may still be stamped without damaging this structure. This is surprising because the stamping technique is well known for its very high heterogeneity in the distribution of the stresses and strains undergone by the component, due to the fact that a high stress is applied instantaneously over the entire area of the blank in contact between the punch and the die, without any possibility of reducing the local stress gradient by the migration of dislocations. The invention has revealed that the coarse-grain recrystallized matrix is stampable without fracture and that the anisotropic coarse grains are capable of bending during the stamping operation without defects appearing in the structure. Thus, when a stamped alloy, having been subjected to a secondary recrystallization heat treatment, does not develop the desired grain growth because the stamping operation has nullified the capability of the departing blank to undergo abnormal recrystallization, the coarse-grain structure can, nevertheless, be obtained in such a stamped component by carrying out the secondary recrystallization annealing at an intermediate stage during the forming, while the applied stress is still tolerated by the blank from the recrystallization standpoint, the annealing operation having the effect of creating and "freezing" the coarse-grained structure, after which the stamping operation is continued on the recrystallized intermediate component with the desired coarse-grained structure.

DETAILED DESCRIPTION OF THE INVENTION

In this regard, the subject of the invention is a process for manufacturing an article, especially a tool which can be used for the production of glass, from a blank consisting of an oxide-dispersion-strengthened alloy having an ultrafine-grained structure, this process comprising:

carrying out a partial hot-forming operation by stamping the blank at a temperature at least equal to its plasticity temperature, in order to form a shaped component;

subjecting the shaped component to a secondary recrystallization heat treatment so as to develop abnormal grain growth; and carrying out a second hot-forming operation by stamping, in order to give the recrystallized shaped component the shape of the article.

Completely unexpectedly, the coarse crystals resulting from the abnormal growth of the initial ultrafine grains are able to deform by stamping without defects appearing in the structure, this stamping being carried out without difficulty (without excessive effort) at the plasticity temperature of the alloy.

The process of the invention is suitable for manufacturing articles of all various shapes, the stamping technique, however, being particularly suitable for the manufacture of objects having at least one concave part.

The invention process applies to all the usual oxide-strengthened alloys in which the matrix is generally based on nickel, cobalt, chromium, platinum, rhodium or iron, and more particularly based on nickel and chromium, and the dispersed oxides are generally yttrium oxide particles.

From one alloy to another, the plasticity temperature and the secondary recrystallization temperature are different, these being, of course, known to those skilled in the art. The hot-forming steps are conducted at a temperature at least equal to the plasticity temperature and preferably below the secondary recrystallization temperature in order to make a clear distinction between the treatment steps.

Each stamping operation is advantageously carried out in the most isothermal manner possible, especially by heating the punch and the die to a suitable temperature.

One advantageous method of implementing the process consists in coating the blank, before each stamping operation, with at least one coating formed by an adhesive based on an inorganic material, especially a glass or ceramic, known per se, the composition of which may advantageously be tailored to withstanding the forming temperature. The inorganic coating is applied so as to constitute a sleeve which envelopes the entire blank and which insulates the latter, on the one hand, from heat transfer with the outside and/or with the stamping tools and, on the other hand, from the frictional forces on the stamping tools.

While it is preferable to carry out the stamping operation at an almost constant temperature, it is also advantageous to cool the component after the first hot-forming operation, and preferably after each hot-working operation, in order to achieve excellent results during the secondary recrystallization phase.

The person skilled in the art is capable of choosing the stamping temperature according to the standard practice, but the present invention provides improvements allowing the final crystalline structure of the alloy to be optimized.

According to the present invention, it has in fact been shown that the stamping temperature has an influence on the development of abnormal grain growth of the alloy during a subsequent recrystallization annealing operation. Thus, it appears that each alloy has a characteristic temperature range such that, when the alloy is stamped beforehand at a forming temperature lying within this range, the size of the secondary recrystallized grain is maximized. Advantageously, at least the first partial forming operation of the process of the invention will therefore be carried out in this temperature range.

This very narrow temperature range, which for simplification may be termed the "optimum stamping temperature", may shift by a few degrees from one alloy batch to another, even if the composition is identical. It may be easily determined by means of an experiment such as the following:

a series of identical alloy test pieces is subjected to a stamping operation under identical conditions, especially load and rate conditions, but at varying temperatures;

the stamped test pieces are subjected to a secondary recrystallization heat treatment (under the known conditions suitable to the alloy used);

the size of the grains obtained following the recrystallization is observed on each test piece (using conventional metallurgical techniques);

the stamping temperature range for which the grains have undergone abnormal growth is determined; and the temperature at which the blank is stamped is chosen to be within the temperature range thus defined.

In order to be more specific, it may be stated that an optimum temperature range for stamping a standard oxide-dispersion-strengthened alloy, especially one based on nickel and chromium, may lie between 700° C. and 1200° C., more particularly between 1050 and 1180° C., especially between 1075° C. and 1125° C., but these indicative values are only given solely by way of illustration.

The process according to the invention is characterized by a first partial forming step in which the stamping operation is such that it preserves the capability of the alloy for abnormal grain growth and such that the intermediate recrystallization annealing provides the desired grain structure.

In this regard, the present inventors have demonstrated the fact that certain alloy blanks have a technical history such that their capability of recrystallizing abnormally is inhibited when the local strain field applied to the blank during stamping exceeds a certain limit characteristic of each blank. In such a case, the partial hot-forming operation will be carried out under conditions such that the local strain field is below the critical limit inhibiting abnormal growth in the alloy blank used.

Those skilled in the art are capable, without excessive effort, of determining by routine operations the amplitude of the stamping strain which may be tolerated by the blank during this first partial forming operation, and at which stage in the forming operation the intermediate annealing step must take place, for example by subjecting a series of specimens of the alloy in question to stamping and recrystallization trials. However, this simple method has the drawback of being tedious as it must be repeated every time the alloy batch is changed and because it is destructive with respect to the specimens used.

The present invention also obviates this drawback and provides a method for determining hot-forming parameters, in particular the local strain field, which preserves or, on the contrary, inhibits the capability of secondary recrystallization with abnormal grain growth.

This method relies on the unexpected discovery by the present inventors that alloy specimens having different technical histories behave in the same way during a secondary recrystallization treatment, i.e. they develop the same grain growth, if they have each been formed beforehand at their optimum forming temperature.

Consequently, it is enough to know the critical range of the local strain field of an alloy of a given chemical composition to result in a single and unique series of stamping and secondary-recrystallization trials on a particular batch of this alloy, in which series of trials the stamping operations are carried out at the optimum forming temperature by varying the local strain field applied and by determining visually, using conventional metallurgical techniques, for which strain fields the abnormal growth takes place or is inhibited.

The results may then be extrapolated to any other batch of alloy of the same composition, provided that it is formed at the optimum temperature which is specific to it.

Compared with the empirical method envisaged above, the method according to the invention makes it possible to omit a significant number of time-consuming steps and to save on raw material, and consequently to rationalize the manufacture.

It should be pointed out that this method, although it is particularly applicable in the process of the invention, should not be limited either to the technique of forming by stamping, the optimum forming temperature being valid for any other deformation technique, or limited to applying to a two-step technique with a second forming operation after the secondary recrystallization. This is because the above method also makes it possible to check, if the total strain necessary for obtaining the desired article does not reach the critical threshold inhibiting abnormal growth, that the coarse-grained structure can be developed in the fully formed component by placing the heat treatment at the final stage of the manufacturing process.

Within the preferred context of the stamping technique, a further subject of the invention is therefore, in particular, a process in which the local strain field applied to the blank during the hot-forming operation, especially partial forming, is chosen to be below the critical limit inhibiting abnormal growth in the alloy used, this process comprising the following prior steps:

a series of test pieces of an alloy of composition identical to the alloy used is subjected to a stamping operation at a temperature chosen within the optimum temperature range for stamping the alloy of which the test pieces are composed, and with varying deformation profiles;

the stamped test pieces are subjected to a secondary recrystallization heat treatment;

the size of the alloy grains is observed at each point in the recrystallized stamped test pieces and the local strain field of the test piece is determined;

the critical range of local strain fields inhibiting abnormal growth is determined, i.e. the fields for which grains resulting from abnormal growth are not observed; and the strain field applied during the partial hot-forming operation is chosen to be outside this critical range.

In general, it is observed that the local strain field exceeds the critical limit inhibiting abnormal growth in highly stressed parts of the blank, in particular at points where the stamping operation causes a significant variation in thickness.

By way of indication, strain fields defined by the pair of values of the true strains $\epsilon_1$ and $\epsilon_2$ (these notations, known per se and commonly used in the modeling of deformations, denote the logarithm of the strain along two orthogonal axes of a circular element of the surface of the initial blank) satisfying the following relationships could in general be regarded as inhibiting the capability of abnormal growth:

$\epsilon_1 > 0.3$ or $\epsilon_1 < 0.01$ $\epsilon_2 > 0.5$ $\epsilon_1 < -0.25\epsilon_2$.

Thus, it will generally be advantageous to apply, during partial forming, the local strain field limited by the following relationships:

$\epsilon_2 \leq 0.5$ $\epsilon_1 \geq -0.25\epsilon_2$ preferably with $0.01 < \epsilon_1 < 0.3$.

As a precaution, strain fields further within this range preserving abnormal growth may be chosen, such as, for example:

$0.025 \leq \epsilon_1 \leq 0.3$ $\epsilon_2 \leq 0.1$, especially $\epsilon_2 \leq 0.05$ $\epsilon_1 \geq -0.5 \epsilon_2$, or even $\epsilon_1 \geq \epsilon_2$.

The invention provides considerable progress in the field of the forming of oxide-dispersion-strengthened alloys as it makes it possible, whatever the shape of the component which it is desired to manufacture, to find an operating protocol which is suitable for the initial material and which guarantees that a microstructure consisting of coarse anisotropic elongate grains is obtained in every component, or at least in all the desired regions of the component, and therefore which guarantees that a component having the optimum properties is obtained.

Among the very varied applications that those skilled in the art will recognize depending on their requirements, the invention applies especially to the manufacture of spinners used for producing mineral fibers by centrifugation, especially glass fibber, comprising a concave part (called the chamber) and a peripheral flap. Thus, when the starting blank is such that the heat treatment on the fully formed component does not successfully give the desired coarse-grained structure throughout the component, in particular in the peripheral flap region, it is possible to manufacture the disc by creating the crystalline microstructure on an intermediate product and then this intermediate product, in which the coarse-grained structure has been frozen, is subsequently converted. Thus, one particular subject of the invention is a process for manufacturing a centrifuging spinner used for producing mineral fibers, especially glass figures, comprising a chamber and a peripheral flap, in which:

during the partial hot-forming operation, the blank is stamped so as to form the chamber and, optionally, a flap with an intermediate inclination;

the recrystallization heat treatment is then carried out; and the peripheral flap is subsequently formed by a new hot-stamping operation, where appropriate by turning down the intermediate flap to the desired inclination.

BRIEF DESCRIPTION OF THE DRAWINGS

Other features and advantages of the invention will appear in the detailed description which follows, given with regard to the appended stampings in which:

FIG. 1 is an explanatory diagram providing a clear definition of the characteristic quantities used hereinafter.

When this blank is stamped vertically (i.e. perpendicular to the plane of the figure) between a punch and a die, which are not illustrated, it undergoes a local deformation at each point on its surface in such a way that the circle centered on this point M, assumes a generally elliptical contour.

Figure 1B:
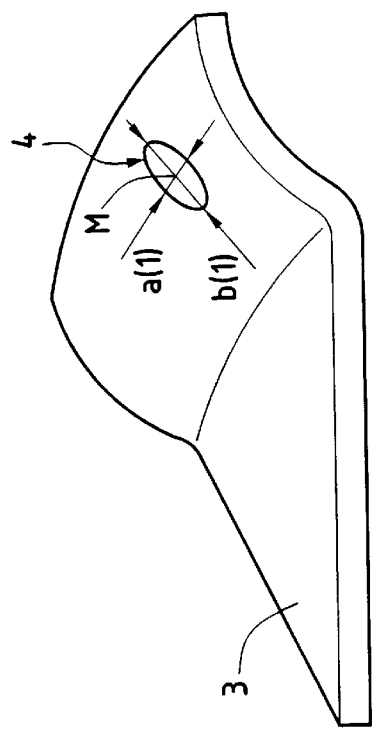
FIG. 1 illustrates the deformation of an alloy blank after a stamping operation, FIG. 1A showing, as a top view, the starting blank and FIG. 1B showing, in perspective, a portion of the stamped blank, and provides a graphical definition of the quantities $\epsilon_1$ and $\epsilon_2$ used in the explanation of the invention.
FIG. 1A shows a top view of a circular blank 1 made of an oxide-strengthened alloy. Depicted on the surface of this blank is a circle 2 centered on a point, the dimensions of which circle are indicated along two orthogonal axes by the diameters a(0) and b(0).
Figure 1A:
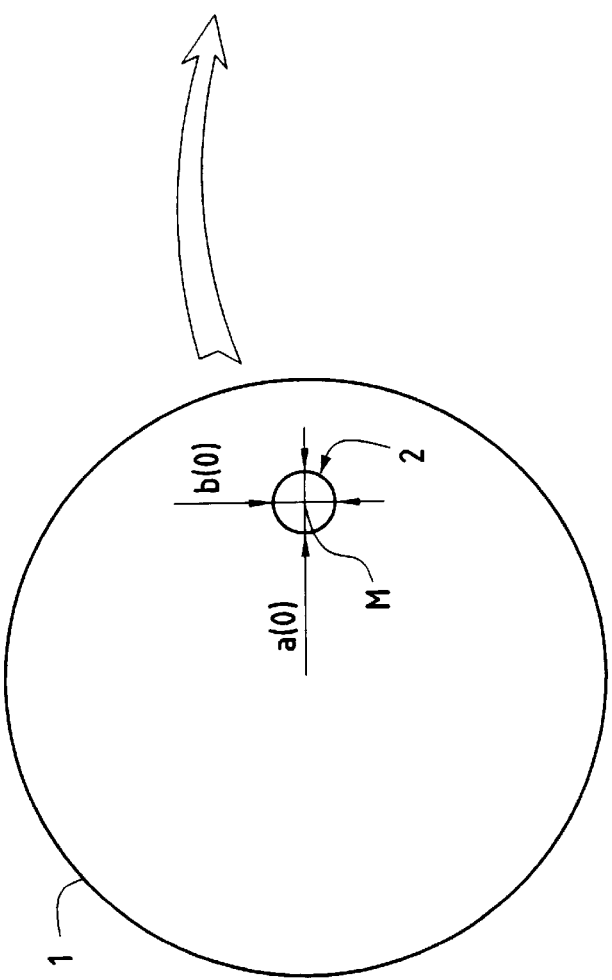

FIG. 1B shows, in perspective, a portion of the resulting stamped element 3 in which the elliptical contour 4 corresponds to the deformed circle 2, the diameters along the two directions becoming, respectively a(1) and b(1).

The local strain field at the point M is expressed by two quantities $\epsilon_1$ and $\epsilon_2$ so-called true strains:

$\epsilon_1 = \ln(b(1)/b(0))$ $\epsilon_2 = \ln(a(1)/a(0))$.

Thus, there is an ($\epsilon_1$, $\epsilon_2$) pair corresponding to each point on the stamped element, The position of these pairs, plotted on a graph of $\epsilon_1 = f(\epsilon_2)$ forms a set of points which constitutes the stamping deformation profile.

Figure 2:
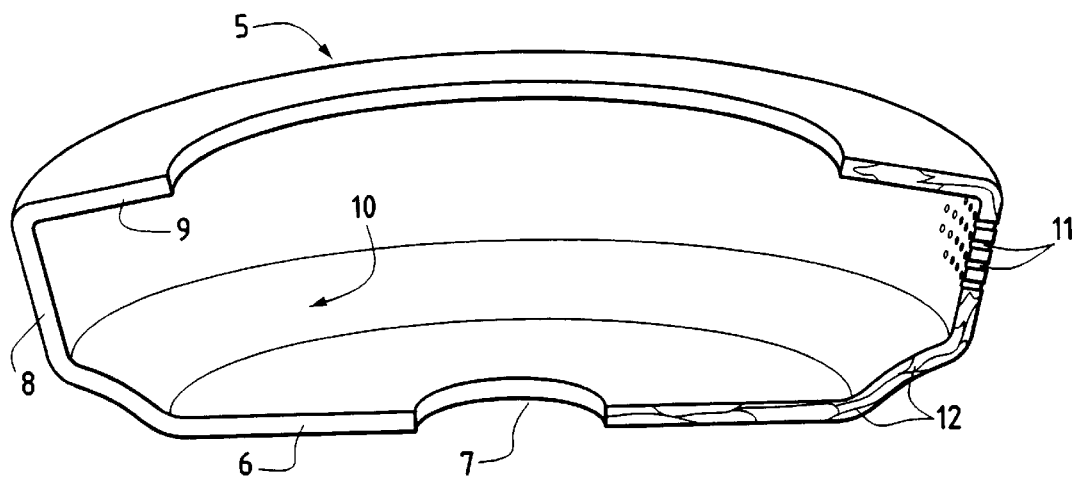
FIG. 2 shows a perspective view of half the centrifuging spinner capable of being manufactured according to the invention.

FIG. 2 shows a perspective view of a spinner 5, cut into two along one of its planes of symmetry, and the process whereby it is manufactured by stamping will now be described.

The spinner 5 has a flat bottom 6 pierced by a hole 7, a side wall 8 and a peripheral flap 9. This profile defines an internal cavity 10, called the chamber, intended in operation for receiving a molten vitreous material, such as glass, which flows out of it, due to the effect of the centrifugal force, via a multitude of perforations 11 made in the wall 8.

According to the invention, this shaped body is manufactured by stamping, starting from a circular blank, such as 1, made of an oxide-strengthened alloy.

The process of the invention makes it possible to obtain, over the entire cross-section of the spinner 5, a microstructure having grains 12 of elongate shape, the length of which is several millimeters, generally varying from 10 to 70 mm. This structure appears after the secondary recrystallization annealing. It may be revealed on the cut edge of the disc cut into two along one of its vertical planes of symmetry, by means of an etching solution, of the type well known in metallurgy.

EXAMPLES

In the example described below, the alloy is based on nickel and chromium, in which the dispersed particles are of yttrium oxide. The precise formulation of this alloy is as follows:

Cr 30% by weight

Ti 0.5% by weight

Al 0.3% by weight

C 0.05% by weight the balance consisting of nickel.

A description will now be given of how to choose the operating sequence to adopt for manufacturing the spinner 5 with the desired crystalline structure.

1. Characterization of the alloy

Figure 3:
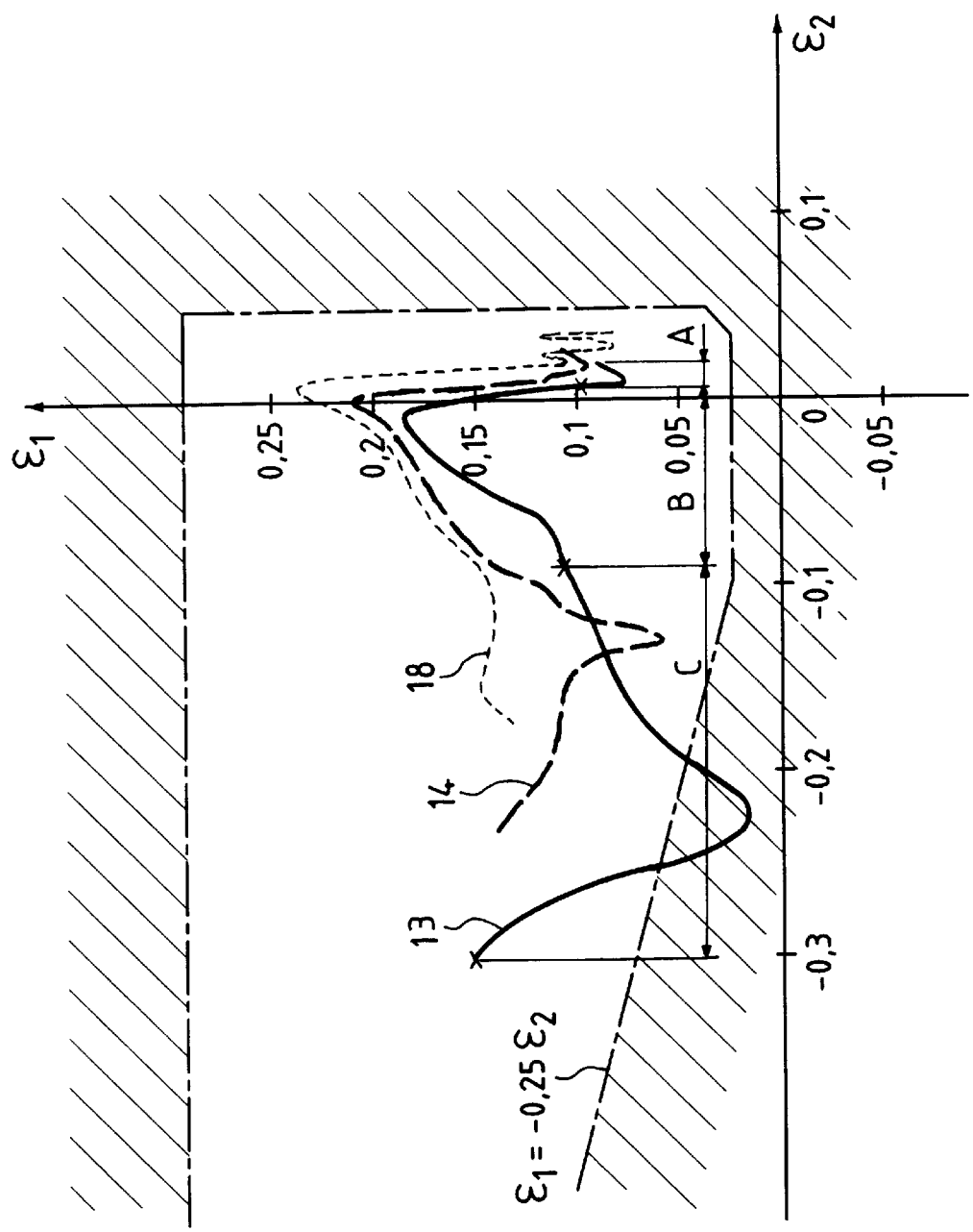
FIG. 3 shows graphically the size of the grains of an oxide-dispersion-strengthened alloy after secondary recrystallization of a stamped component as a function of the local strain field expressed in an ($\epsilon_1$, $\epsilon_2$) system.

A series of trials for constructing a calibration diagram, shown in FIG. 3, is carried out, or else will have been carried out, beforehand.

This series of trials carried out on an alloy of identical composition to that which it is desired to use, but not necessarily on a specimen coming from the same commercial batch, was used to determine:

(a) the optimum temperature range for forming the alloy, and (b) the critical strain field range inhibiting abnormal growth of the grains of this same alloy.

(a) Test pieces are cut from the alloy plate, these being in the form of bars with a length of 60 mm, a width of 15 mm and a thickness of that of the plate.

These test pieces are first of all sand blasted and coated with a ceramic adhesive on which, according to the teaching of EP-A-0,668,122, incorporated herein by reference a glass cloth is placed.

The test pieces thus prepared are then subjected to the same compression to a defined thickness (stamping under a punch whose stroke is blocked by a wedge), each at a different temperature between 900 and 1200° C., and then they are left to cool down to room temperature.

Next, all the stamped test pieces are recrystallized under the same conditions: temperature rise of 5° C./min from ambient temperature up to the recrystallization temperature of 1320° C., a temperature hold at this temperature for 1 h 30 min. and then cooling down to room temperature.

Each cooled test piece is characterized by a visual examination of the size of the grains using conventional metallurgical techniques.

The narrow temperature range in which the grains are coarsest (minimum size greater than 10 mm, for example), is thus visually determined.

In the case of the above alloy, this range was 1075° to 1125° C. for the batch in question.

(b) Another series of test pieces of various shapes and sizes is then cut from the same alloy plate and subjected to three-dimensional stamping trials to produce various shapes in order to cover a relatively wide strain field spectrum.

The width of this spectrum will depend on whether it is desired to provide ranges for the manufacture of a single shape of component or several shapes of component, but it will, of course, encompass at least the deformation profiles corresponding to the components desired. Consequently, the number of trials will therefore be fixed by the person skilled in the art.

For these trials, the test pieces are prepared as previously, by sand blasting and coating with an inorganic coating. The stamping operations are all carried out at the same temperature of 1100° C. (within the optimum range) and under the same conditions, especially the rate of stamping.

They are followed by secondary recrystallization annealing under the same conditions as previously.

Next, the recrystallized stamped components are analyzed using conventional metallurgical techniques in order to determine, at each point in the component, the grain size of the alloy.

The results are combined in the form of a graph, illustrated in FIG. 3, which indicates, as a function of the local strain field applied to the blank and expressed in an ($\epsilon_1$, $\epsilon_2$) system, the size of the grains obtained: the hatched area shows the range of strain fields applied to the parts of the component where the grains have a size of less than 10 mm, i e. the critical strain fields inhibiting abnormal grain growth of the alloy.

FIG. 3 shows that the particular alloy in question does not undergo abnormal grain growth after a stamping operation corresponding to a strain field lying within the following ranges.

$\epsilon_1 > 0.3$
$\epsilon_1 < 0.025$
$\epsilon_2 > 0.05$
$\epsilon_1 < -0.25\epsilon_2$ However, when the profile of the stamped component is such that strain fields of this order are necessary, the invention has shown that a solution existed whereby this component does have, nevertheless, the desired coarse-grained structure.

This solution consists in manufacturing an intermediate component with a profile corresponding to local strain fields lying outside the critical range defined on the graph, preferably as close as possible to the boundary of this range. It is this intermediate piece that is subjected to the secondary recrystallization treatment in order to create the coarse-grained structure. Next, the final deformation is applied, while maintaining this structure.

2. Determination of the manufacturing process

The strain field to be applied at each point of the blank 1, in order to form the spinner 5 by stamping, may be calculated mathematically, in a manner known per se, from the dimensions of this component.

Thus, on the graph of FIG. 3, curve 13 is a plot, in the ($\epsilon_1$, $\epsilon_2$) co-ordinance system, of the co-ordinates of all the calculated ($\epsilon_1$, $\epsilon_2$) pairs.

On curve 13, called the "line of deformation" of the article 5, the portions A, B and C correspond respectively to the bottom 6 of the spinner, to the wall 8 and to the flap 9.

It will be noted that portion C corresponding to the bending between the wall 8 and the flap 9, lies in the critical region so that, after stamping, the recrystallization will not produce the desired coarse grains in this portion of the component which is highly stressed in operation.

Thus one will therefore choose to form, firstly, an intermediate component corresponding to the line-of-deformation curve 14, close to curve 13 but lying outside this region.

By means of a mathematical calculation which is the inverse of the previous one, the corresponding geometrical shape of the component is determined and the stamping protocol is adapted accordingly.

The above modeling is valid only if the alloy is worked within its optimum temperature range.

In order to apply the chosen process to the particular alloy batch to be used, it is therefore necessary first of all to determine this range.

If the alloy blank used comes from a batch other than that studied at points 1 and 2, the first stamping series at varying temperatures in thus repeated.

3. Application

For the manufacture, a sheet of oxide-dispersion-strengthened alloy was used whose optimum stamping temperature range, determined as above, was from 1075 to 1125° C.

In practice, a first partial forming operation, in two steps, was carried out, followed by secondary recrystallization annealing, and finally the forming process was completed.

Figure 4:
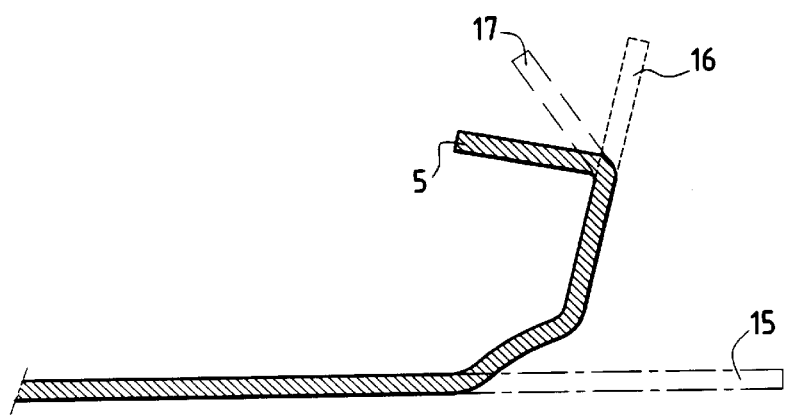
FIG. 4 shows diagrammatically the change in cross-section of the blank at each stage in the manufacture according to the invention of the disc shown in FIG. 2.

FIG. 4 shows the change in the cross-section of the blank during this process:
   the profile 15 in dot-dash lines represents the initial blank,
   a first stamping operation, according to the profile 16 in dotted lines, forms the wall 8 and the chamber of the spinner,
   a second stamping operation, according to the profile 17 in broken lines, forms a flap with an intermediate inclination, and
   a third stamping operation, performed after the secondary recrystallization, brings the intermediate flap to its final inclination.

Plotted in the graph of FIG. 3 are the line-of-deformation curves corresponding to each partial stamping operation: curves 18 and 14 correspond respectively to the first and second stamping operations. Curve 13, already discussed, corresponds to the formation of the final flap.

Before the first forming operation, the blank was sand blasted and coated with an inorganic coating in the same way as above. The coating is partially renewed before each stamping phase. The recrystallization annealing was carried out under the conditions already mentioned: temperature rise of 5° C./min and a temperature hold of 1 h 30 min at 1320° C.

After this secondary recrystallization heat treatment, the component has a coarse-grained structure, which is maintained during the subsequent stamping operation, in which the grains have a length of about 50 mm.

The above detailed description was given for the particular case of manufacturing a centrifuging spinner. It goes without saying that the invention applies to the manufacture of any other shaped article.

French patent application 97 07562 is incorporated herein by reference.

I claim:

1. Process for manufacturing an article from an oxide-dispersion-strengthened alloy blank having an ultrafine-grained structure, comprising carrying out a partial hot-forming operation by stamping said blank at a temperature at least equal to its plasticity temperature, in order to form a shaped component;

subjecting the shaped component to secondary recrystallization heat treatment so as to develop abnormal grain growth; and carrying out a second hot-forming operation by stamping, in order to provide the secondary recrystallized shaped component the shape of the article.

2. Process according to claim 1, in which the metal blank is coated, before the stamping operation, with an adhesive comprising an inorganic material.

3. Process according to claim 1, in which the component is cooled after each hot operation.

4. Process according to claim 1, further comprising the following prior steps:

a series of identical alloy test pieces is subjected to a stamping operation under identical conditions, but at varying temperatures;

the stamped test pieces are subjected to a secondary recrystallization heat treatment;

the size of the grains obtained following the recrystallization is observed;

the stamping temperature range for which the grains have undergone abnormal growth is determined; and wherein the temperature at which the blank is stamped is chosen to be within the stamping temperature range thus defined.

5. Process according to claim 1, in which stamping is carried out in a temperature range of from 700 to 1200° C.

6. Process according to claim 1, in which the local strain field applied to the blank during the partial hot-forming operation is below the critical limit inhibiting abnormal growth in the alloy used.

7. Process according to claim 6, further comprising the following prior steps:

a series of test pieces of an alloy of composition identical to the alloy blank used is subjected to a stamping operation at a temperature in which abnormal grain growth is observed, and with varying deformation profiles;

the stamped test pieces are subjected to a secondary recrystallization heat treatment;

the size of the alloy grains is observed at each point on the recrystallized stamped test pieces and the local strain field of the test pieces is determined;

the critical range of local strain fields inhibiting abnormal growth is determined, i.e. the fields for which grains resulting from abnormal growth are not observed; and the strain field applied during the partial hot-forming is chosen to be outside this critical range.

8. Process according to claim 1, in which the local strain field applied during the partial forming satisfies, at every point in the blank, the relationship:

$\epsilon_1 \geq -0.25\epsilon_2$ $\epsilon_2 \leq 0.5$

9. Process for manufacturing a spinner used for producing mineral fibers by centrifugation, comprising a chamber and a peripheral flap, comprising:

carrying out a partial hot-forming operation by stamping an oxide-dispersion-strengthened alloy blank having an ultrafine grain structure at a temperature at least equal to its plasticity temperature, in order to form a shaped component, subjecting the shaped component to secondary recrystallization heat treatment so as to develop abnormal grain growth; and carrying out a second hot-forming operation by stamping, in order to provide the secondary recrystallized shaped component the shape of the article wherein during the partial hot-forming operation, the blank is stamped so as to form the chamber and, optionally, a flap with an intermediate inclination;

the recrystallization heat treatment is then carried out; and the peripheral flap is subsequently formed by a new hot-stamping operation, where appropriate by turning down the intermediate flap to the desired inclination.

* * * * *